US007406180B2

(12) United States Patent
Milde

(10) Patent No.: US 7,406,180 B2
(45) Date of Patent: Jul. 29, 2008

(54) HEADPHONE WITH BEHIND-THE-HEAD HEADBAND

(75) Inventor: Lars Milde, Hannover (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 0 days.

(21) Appl. No.: 10/571,729

(22) PCT Filed: Sep. 9, 2004

(86) PCT No.: PCT/EP2004/010039

§ 371 (c)(1),
(2), (4) Date: Dec. 7, 2006

(87) PCT Pub. No.: WO2005/027567

PCT Pub. Date: Mar. 24, 2005

(65) Prior Publication Data

US 2007/0071269 A1 Mar. 29, 2007

(30) Foreign Application Priority Data

Sep. 12, 2003 (DE) ................................ 103 42 532

(51) Int. Cl.
*H04R 25/00* (2006.01)
*G10K 11/00* (2006.01)
*A42B 1/06* (2006.01)
*H04M 1/00* (2006.01)

(52) U.S. Cl. ........................... 381/378; 379/430; 2/209; 181/126; 381/374; 381/370; 381/379; 381/387; 381/9

(58) Field of Classification Search ................. 181/126; 2/209; 379/430; 381/378, 370, 72, 334, 381/182, 374, 376, 377, 379, 381, 383
See application file for complete search history.

(56) References Cited

U.S. PATENT DOCUMENTS

| | | | | |
|---|---|---|---|---|
| 1,560,718 | A * | 11/1925 | Nowosielski | 381/377 |
| 3,053,944 | A * | 9/1962 | Weeks | 381/377 |
| 4,517,418 | A | 5/1985 | Baran et al. | |
| 4,821,323 | A | 4/1989 | Papiernik | |
| 6,385,325 | B1 * | 5/2002 | Nageno et al. | 381/374 |

(Continued)

FOREIGN PATENT DOCUMENTS

DE 198 10 582 9/1998

(Continued)

OTHER PUBLICATIONS

XP002320674 Koss: Online 1999 (http//www.koss.com/kossweb.nsf/02PRcopy/SPORTAPRO).

*Primary Examiner*—Wayne Young
*Assistant Examiner*—Dionne H Pendleton
(74) *Attorney, Agent, or Firm*—Reed Smith LLP

(57) ABSTRACT

There is provided a headphone with a behind-the-head headband comprising at least one transducer and a behind-the-head headband for receiving the transducer. The behind-the-head headband further comprises first and second contact locations for resting against a temporal bone of a wearer of the headphone. The spacing between the transducer and the first or second contact location can be adjusted. By virtue of the possibility of adjusting the spacing with respect to the contact location the transducer can be positioned exactly over the auditory channel of the headphone wearer without pressure points on the ear.

9 Claims, 6 Drawing Sheets

U.S. PATENT DOCUMENTS

| | | | | |
|---|---|---|---|---|
| 6,879,699 | B1 * | 4/2005 | Logan | 381/367 |
| 2002/0168081 | A1 | 11/2002 | Sato | |

FOREIGN PATENT DOCUMENTS

| | | |
|---|---|---|
| EP | 1 2 50 025 | 10/2002 |
| JP | 58-161382 | 10/1983 |
| JP | 62-161486 | 10/1987 |
| JP | 10-257581 | 9/1998 |
| JP | 2000-201390 | 7/2008 |

* cited by examiner

HEADPHONE WITH BEHIND-THE-HEAD HEADBAND

CROSS-REFERENCE TO RELATED APPLICATION

This application claims priority of International Application No. PCT/EP2004/010039, filed Sep. 9, 2004 and German Application No. 103 42 532.2, filed Sep. 12, 2003, the complete disclosures of which are hereby incorporated by reference.

BACKGROUND OF THE INVENTION a) Field of the Invention

The invention concerns a headphone with behind-the-head headband. Headphones with behind-the-head headbands represent headphones in which the headphone band is not worn on the head but at the back of the head.

b) Description of the Related Art

As state of the art, attention is directed in this matter to DE 198 10 582 A1.

As diagrammatically illustrated in FIG. 5, a transducer 300 is hooked in position on the ear so that the band 100 or the behind-the-ear hook rests on the junction root of the ear. In that arrangement, the nape-of-the-neck band 100 stands away in the region of the nape of the neck as, if it were in contact therewith, it would interfere with movements of the head. In addition, the fact that the band 100 or the behind-the-ear hook rests directly on the root of the ear is found to be disadvantageous as perspiration and pressure points are quickly formed there, in particular at elevated temperatures, so that this involves a reduced level of wearing comfort. Furthermore, that arrangement is found to be disadvantageous particularly for people who wear spectacles, as spectacles generally also rest on the root of the ear so that it is not possible to wear spectacles and a headphone of that kind at the same time. As that arrangement does not provide that the transducers are directly pressed against the ears of the person wearing the headphone, only poor acoustics can be achieved. As most headphones with a behind-the-head headband have a rigid band-transducer system, the acoustics of that headphone are different in relation to each head so that a firm fit for the headphone and thus optimum acoustics can be achieved only in the case of very few people with appropriately matching heads and ears.

The corporation Koss markets a headphone SportaPro which can be used both as a conventional headphone and also as a headphone with a behind-the-head headband. That headphone has a behind-the-head headband with two contact points in spaced relationship with the two transducers. If that headphone is used as a headphone with a behind-the-head headband, those two contact points bear against the temporal muscle above the ear. In that case the behind-the-head headband is designed to be adjustable in length so that approximate adaptation to the corresponding head of the headphone wearer is possible, but that arrangement does not guarantee optimum contact pressure for the transducer.

OBJECT AND SUMMARY OF THE INVENTION

Therefore the primary object of the present invention is to provide a headphone with a behind-the-head headband, which can adapt to different head and ear shapes and in that case guarantees a minimum contact pressure of the transducers against the ears of the wearer.

That object of the invention is attained by a headphone with a behind-the-head headband comprising at least one electroacoustic transducer and a behind-the-head headband for holding the electroacoustic transducers. The behind-the-head headband has at least a first and a second contact location for contact against a temporal bone of a wearer of the headphone. The spacing between the electroacoustic transducer and the first or second contact location is adjustable. The behind-the-head headband has a first portion and at least one second portion. The first and second portions come together at an angle location and there is a predetermined angle between the first and second portions. The electroacoustic transducer is arranged at the second portion of the behind-the-head headband. The electroacoustic transducer is displaceable along the longitudinal axis of the second portion of the behind-the-head headband in such a way that the spacing between the electroacoustic transducer and the first or second contact location as well as the spacing between the behind-the-head headband and the head of a wearer of the behind-the-head headband is adjusted.

Therefore there is provided a headphone with a behind-the-head headband with at least one transducer and a behind-the-head headband 10 for receiving the transducer 30. The behind-the-head headband 10 also has first and second contact locations for resting on a temporal bone of a wearer of the headphone. The spacing between the transducer and the first or second contact location can be adjusted.

The possibility of adjustment of the spacing with respect to the contact location means that the transducer can be positioned exactly over the auditory channel of the headphone wearer without pressure points on the ear.

In accordance with an aspect of the present invention, the transducer is adapted to be pivotable about the behind-the-head headband whereby it is possible to set a suitable angle between transducer and temples of the headphone wearer so that the transducer can be adapted to different ear shapes of the headphone wearer. That contributes considerably to an improved contact pressure and thus improved acoustics for the headphone.

In accordance with a further aspect of the present invention, the behind-the-head headband 10 has a first portion 10 and at least one second portion 10*b*. The first and second portions 10, 10*b* come together at an angle location (10*a*) so that there is a predetermined angle between them. In that arrangement, the transducer is disposed on the second portion of the behind-the-head headband.

In accordance with a preferred aspect of the present invention, the transducer 30 can be displaced along the longitudinal axis of the second portion of the behind-the-head headband. That can provide for length adaptation of the headband to the back of the head of a headphone wearer simultaneously with adaptation of the contact pressure. As the transducer 30 is positioned on the ear of the headphone wearer, it is therefore not the transducer but the behind-the-head headband that is displaced with respect to the head of the headphone wearer.

In accordance with a further preferred aspect of the present invention, the second portion is designed to be inclined inwardly. If now the headphone with the behind-the-head headband is to be adapted to the corresponding shape of the head of the wearer of the headphone, the transducer is held stationarily over the auditory passage of the headphone wearer and the spacing between the first or second contact location and the transducer is altered. That is effected by the contact locations being pressed against the head of the headphone wearer upon an increase in the spacing between the contact location and the transducer. In that way contact pressure can be obtained both at the temple of the wearer and also between the transducer and the ear, and can be mutually matched.

In accordance with a further aspect of the present invention, the second portion is of a convexly curved configuration. The convex configuration of the second portion provides that the transducer which is displaceable along the longitudinal axis of the second portion is also adapted in its angular position to the ear and at the same time to the angle of the head of the headphone wearer.

In accordance with a further aspect of the present invention, the transducer has a self-locking arresting means. That, therefore, prevents the transducer from being accidentally displaced in respect of its position relative to the contact location.

Further aspects of the present invention are subject matter of the appendant claims.

The present invention is described in greater detail hereinafter with reference to the drawings:

DESCRIPTION OF THE PREFERRED EMBODIMENTS

Figure 1:
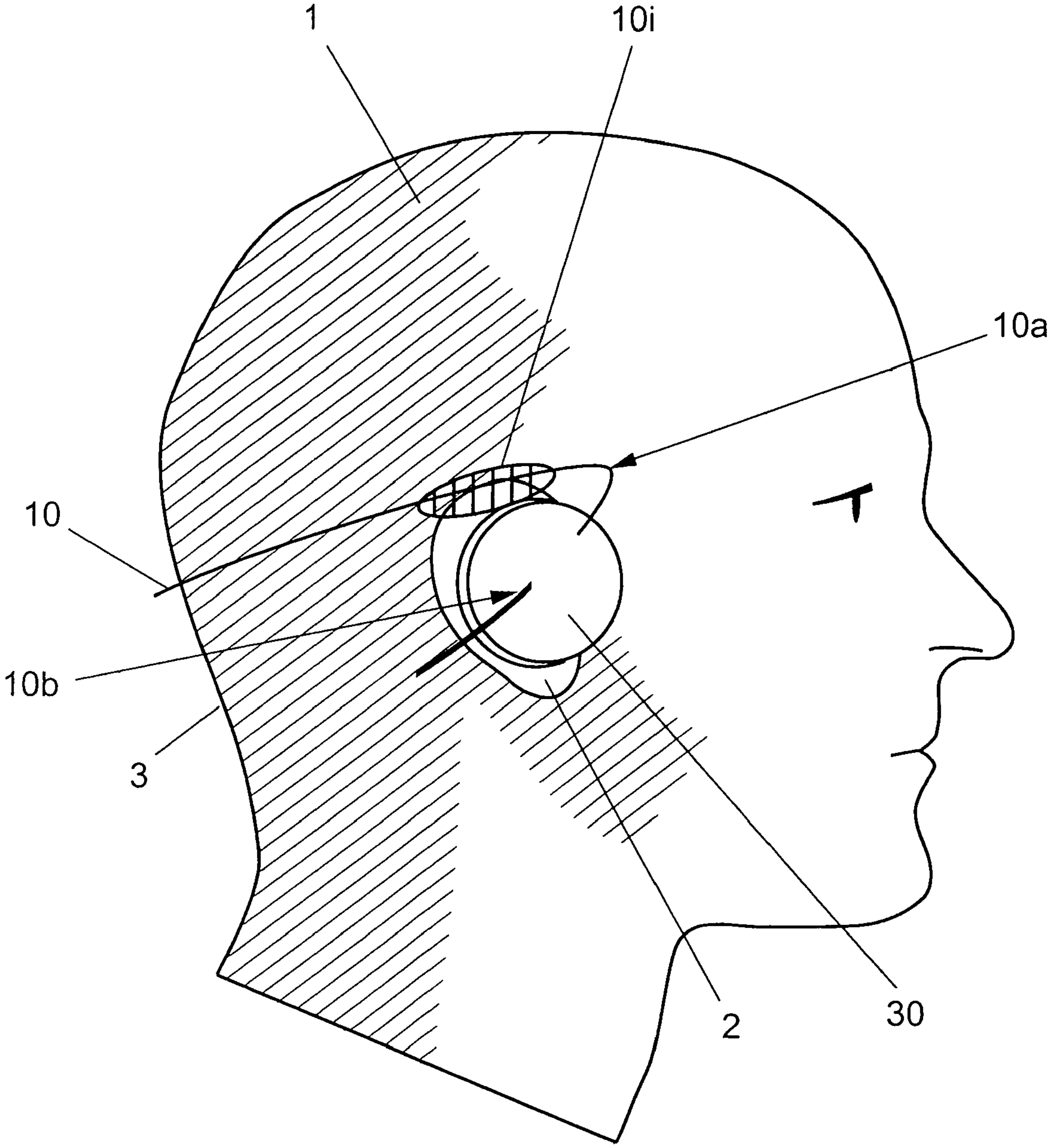
FIG. 1 shows a side view of a headphone with a behind-the-head headband, and a person wearing the headphone.

FIG. 1 shows a side view of a headphone wearer 1 and a headphone with a behind-the-head headband according to the invention. In this case the figure shows in particular the head 1, an ear 2 as well as the back of the head 3 of a headphone wearer. The headphone according to the invention comprises a behind-the-head headband 10 and a transducer 30 fixed to the behind-the-head headband 10. The behind-the-head headband substantially comprises a first and a second portion 10, 10*b* which meet at a location 10*a* which represents an angle configuration. In other words, the behind-the-head headband has a first portion which extends in a substantially horseshoe shape around the back of the head of the headphone wearer. In that case the second portion 10*b* is arranged at a predetermined angle relative to the first portion, that is to say the second portion 10*b* is bent around the angle configuration 10*a*. In this arrangement the transducer 30 is arranged at the second portion 10*b* of the behind-the-head headband and can be positioned on the ear 2 of the headphone wearer.

Also shown (in broken line) is a contact region 10*i* showing that region of the behind-the-head headband which comes to bear against the temple or the temporal bone of the headphone wearer. When reference is made in the present application to a temporal bone, that is used to denote both the region of the human temporal bone and also the temporal muscle disposed thereabove.

Figure 2A:
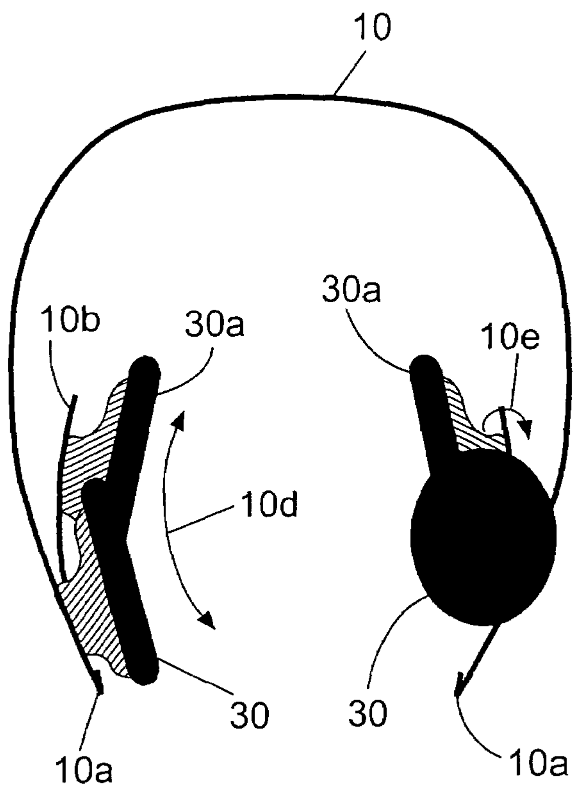
FIG. 2*a* shows a plan view of a headphone with a behind-the-head headband according to the invention.

FIG. 2*a* shows a plan view of the headphone with behind-the-head headband as shown in FIG. 1. In this case the first portion 10 of the behind-the-head headband is substantially horseshoe-shaped so that, when the headphone is being worn, there is a prestressing against the temples of the headphone wearer at the contact locations 10*i* so that there is a desired contact pressure there and the headphone is guaranteed to be securely held in position. The transducers 30 are arranged in the region of the second portion 10*b* in such a way that they can be displaced along the longitudinal direction 10*d* of the second portion 10*b*. In addition the transducers 30 are arranged rotatably or pivotably about the longitudinal axis of the second portion 10. By virtue of the fact that the transducers are arranged both displaceably along the longitudinal direction 10*d* of the second portion and also rotatably with respect to the longitudinal direction, it is possible to provide further degrees of freedom in respect of adjustability of the transducers and adaptability of the headphone to the different shapes of head and ears of the headphone wearers is improved.

Figure 2B:
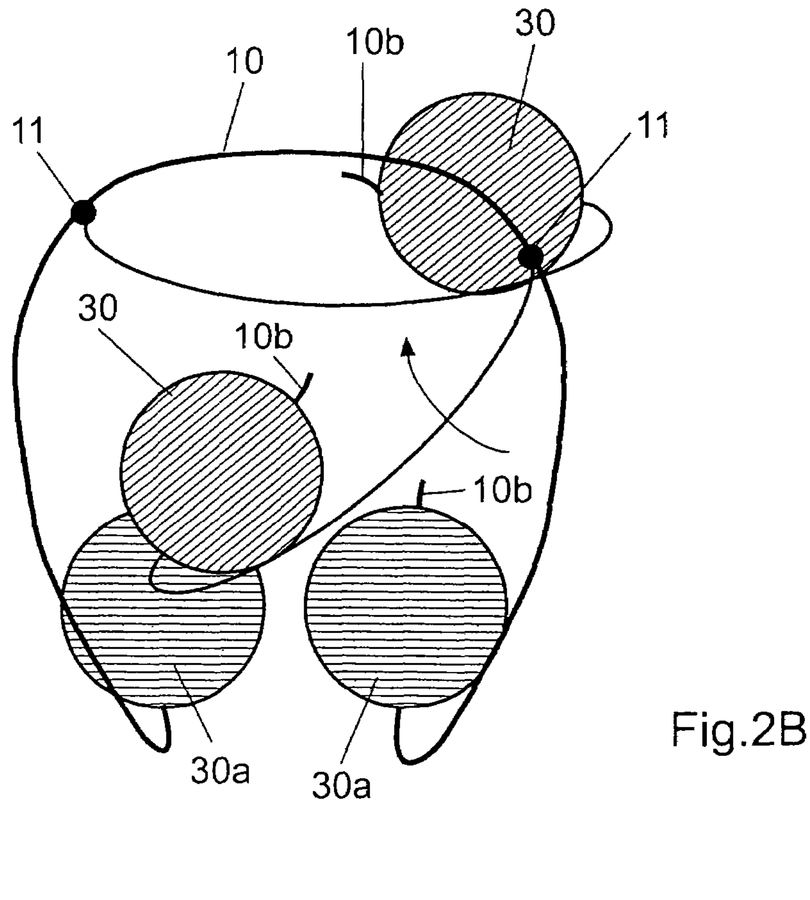
FIG. 2*b* shows a plan view of a headphone according to the invention in the position of use and in a transport position.

FIG. 2*b* shows a transport and stowage position of the headphone of FIG. 1. In addition to the headphone shown in FIG. 2*a*, the headphone shown in FIG. 2*b* has two hinges 11 so that the headphone can be folded together. By virtue of the fact that the transducers 30 are arranged rotatably or pivotably on the second portion 10*b* and has the hinges 11, the headphone can be folded together in such a way that it takes up only a small amount of space. In that way the headphone can be disposed for storage purposes for example in a storage box similar to a spectacles case. The small pack dimension in the folded-together condition is also advantageous in regard to transport and storage.

Figure 3A:
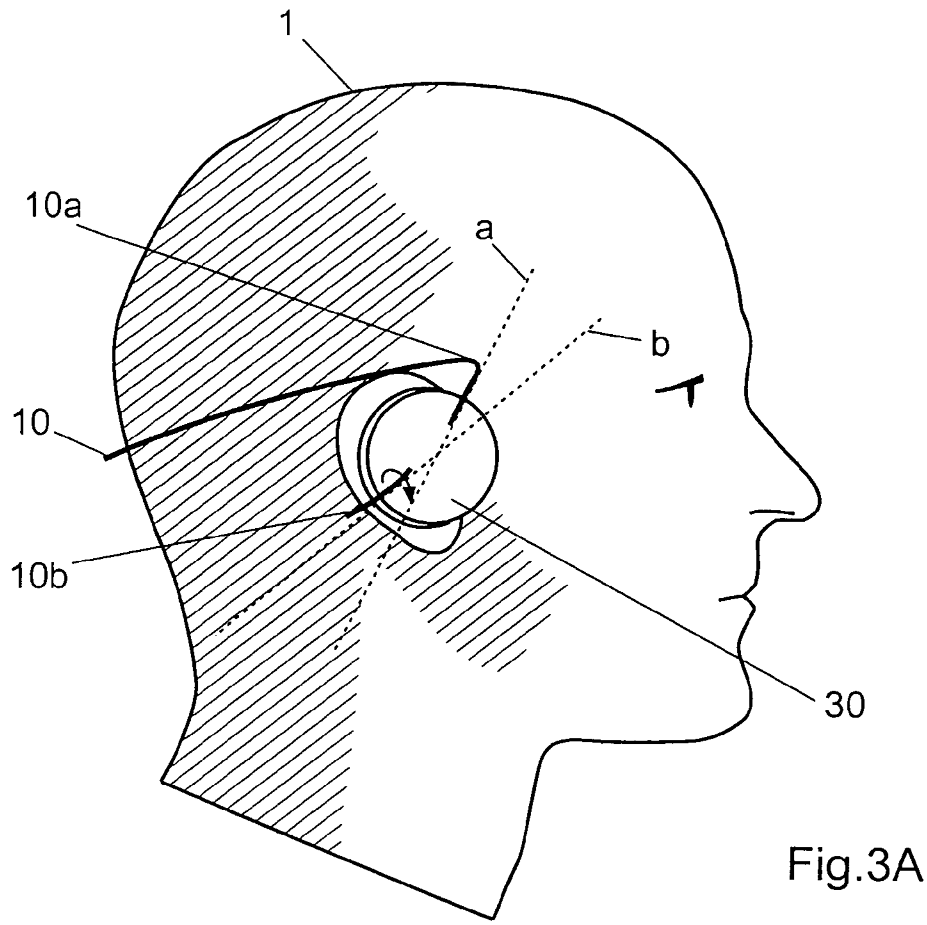
FIG. 3*a* shows a further side view of a headphone according to the invention together with the headphone wearer.

FIG. 3*a* shows a further side view of a headphone wearer with a headphone according to the invention. In this case the second portion 10*b* of the behind-the-head headband is of a slightly convex configuration. Displacement of the transducer 30 along the longitudinal axis of the second portion thus also causes a change in the axes of rotation a, b of the transducer 30. The altered axes of rotation a, b provide that the adaptability of the headphone to the respective shapes of the ears of the headphone wearer is improved. By virtue of the specific configuration of the second portion 10*b*, it is possible to provide for adaptation to the ear angles, in the horizontal and vertical directions. The configuration of the angled portion 10*b* provides that the tilt angle of the transducers 30 can be varied. That tilt angle results substantially from addition of the lateral head angle shown in FIG. 1 and the ear angle shown in FIG. 7.

Figure 3B:
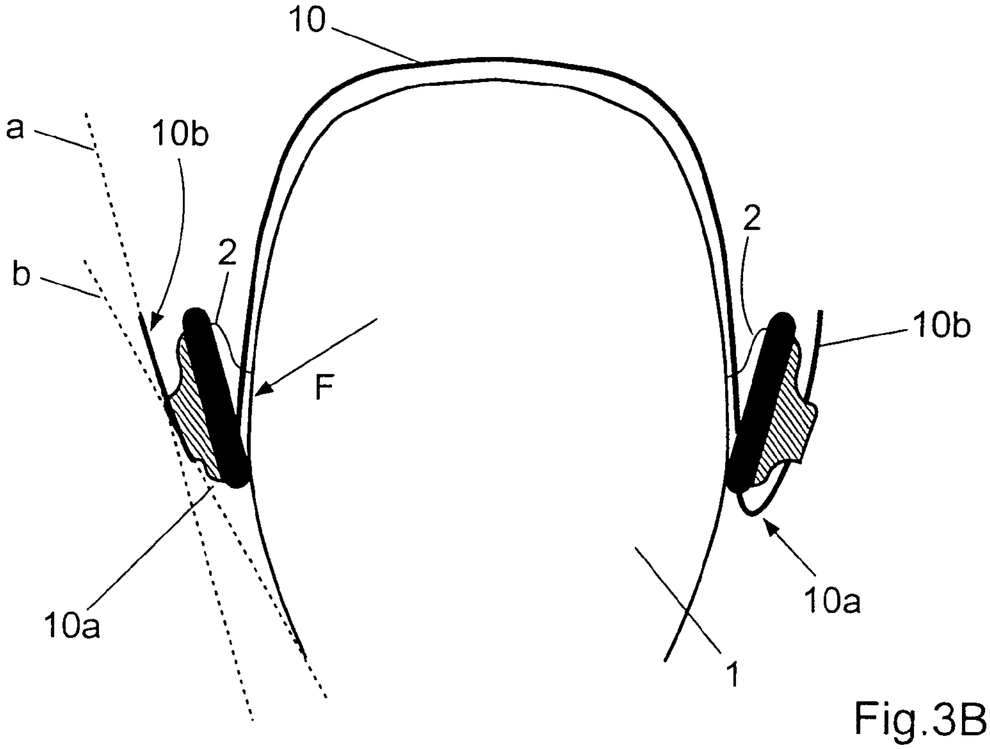
FIG. 3*b* shows a plan view of a headphone according to the invention together with the headphone wearer.

FIG. 3*b* shows a plan view of a wearer of a headphone according to the invention. In this case the second portion 10*b* of the headband is also of a convex configuration, with respect to the plane of the sheet of paper of FIG. 3*b*. Accordingly the pressure angle a, b is varied by displacement of the transducer 30 along the longitudinal axis of the second portion 10*b* and by more elastic material cross-sections or materials for the second portion. In that respect the pressure angle represents the angle between the transducer and the head of the headphone wearer. By varying the pressure angle, the adaptability of the headphone according to the invention to the corresponding shape of the ears of a headphone wearer can be further improved. The contact pressure as indicated at F of the transducer 30 against the ears 2 of the headphone wearer is achieved by the spring pressure of the first portion of the headband 10 or the prestressing thereof by virtue of its horseshoe shape and the flexing effect that this entails. The adjustment setting of the transducers by bending and torsion also further contributes to the contact pressure F. In addition, with the shape of the first portion 10 or the shape of the head side piece remaining the same, it is possible to achieve different ear angles by virtue of the spring elasticity of the second portion 10*b*. Adjustment of the transducer serves primarily for moving the head side pieces to the head and for adjusting the pressure between the head and the ear.

Figure 4A:
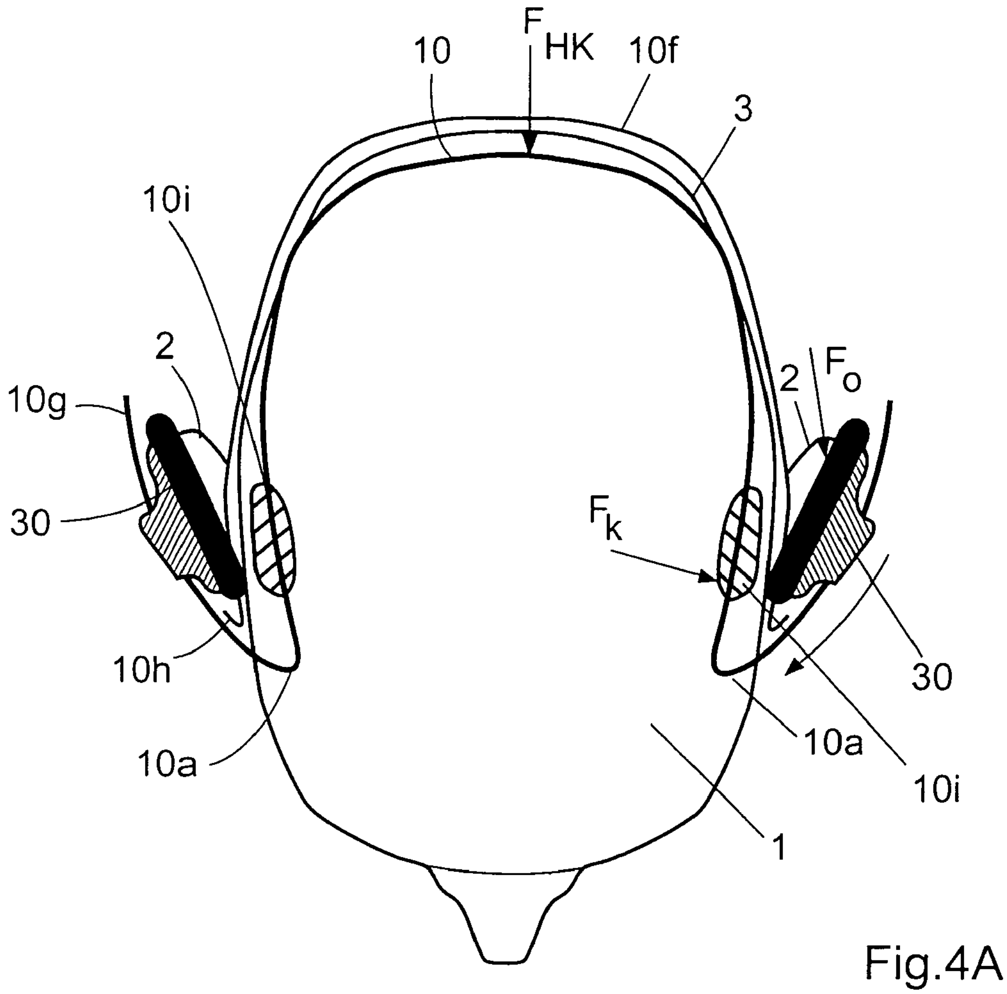
FIG. 4*a* shows a further plan view of a headphone according to the invention and a headphone wearer.

FIG. 4*a* shows a further plan view of a person wearing the headphone according to the invention. More precisely, shown therein are two setting positions for the headphone shown in FIG. 1. In the first position of the headphone according to the invention, the headphone is firstly fitted approximately and the two transducers are positioned on the two ears 2 of the headphone wearer. In that case the first portion 10*f* of the behind-the-head headband is at a certain spacing from the back of the head 3 of the headphone wearer. With this arrangement, in that position the two contact locations 10*h* of the headphone are generally disposed a little above the junction roots of the ears of the person wearing the headphone. The headphone is now adapted to the specific shape of the head and ears of the headphone wearer. For that purpose the transducers are suitably positioned on the ears 2 of the wearer and the second portion of the band is displaced relative to the transducers 30. As the two transducers are already disposed at the appropriate location, that is to say above the auditory channel of the headphone wearer, it is not the transducers but the first and second portions 10, 10*b* of the headband that are displaced. By virtue of the displacement of the second portion 10*b*, the headband or the contact location 10*i* presses against the head and thus produces a contact pressure against the temple of the headphone wearer. By virtue of the transducer 30 being relatively lightly arrested on the second portion and by virtue of the provision of a more flexible second portion, that arrangement provides for dividing up the pressure against the ear and the pressure against the head, that is to say displacement of the behind-the-head headband causes an increase in the contact pressure against the head and a reduction in the contact pressure against the ears. That pressure force which acts laterally against the head and the temple of the headphone wearer is identified as $F_k$. The first portion 10 is also displaced by virtue of the displacement of the second portion 10*b* so that this affords a contact pressure $F_{hk}$ at the back of the head of the wearer.

Figure 4B:
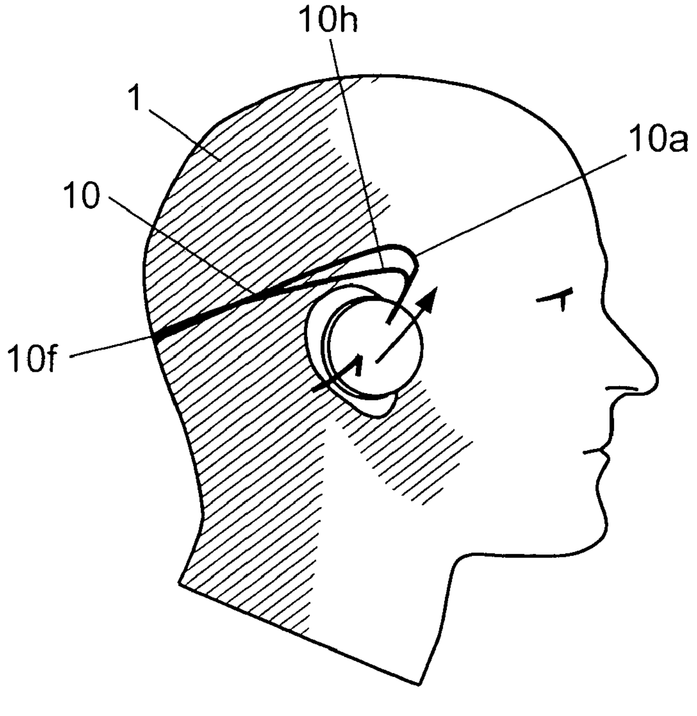
FIG. 4*b* shows a further side view of a headphone according to the invention and a headphone wearer.
Figure 5:
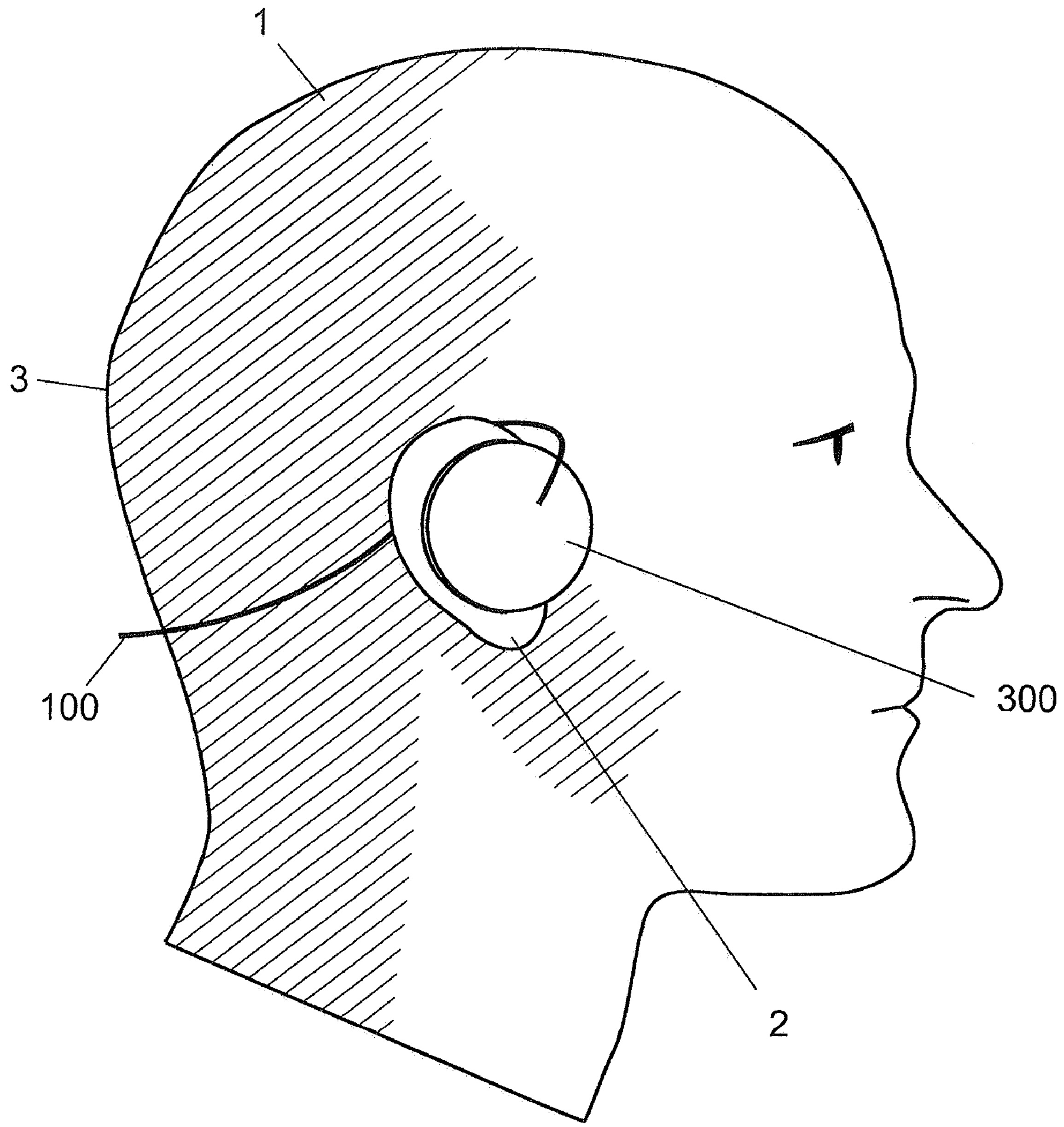
Fig.5 PRIOR ART
FIG. 5 shows a side view of a headphone in accordance with the state of the art and a headphone wearer.

FIG. 4*b* shows a side view corresponding to the plan view of FIG. 4*a*. As in FIG. 4*a*, the Figure shows two adjustment conditions of the headphone according to the invention. In the first adjusted position the contact location is identified by reference 10*h* while in the second position the contact location is denoted by reference 10*i*. As shown by the arrow in FIG. 4*b* the second portion is displaced relative to the transducer so that the contact location 10*i* is also displaced, which also has the result that the first portion of the band is also displaced on the back of the head. While the first portion of the band is disposed loosely on the head in the first position, the first portion is pressed against the back of the head 3 of the headphone wearer, with the contact pressure force $F_{hk}$.

The transducers 30 are connected to the second portion 10*b* by a self-locking arresting effect. That arresting effect can be implemented for example by tilting, frictional engagement and/or by a latching means, ensuring that the transducers yield in the case of an overload. The first and second portions of the behind-the-head headband can involve variable cross-sections and comprise spring steel and/or plastic material. The headband or the first and second portions of the headband can preferably be of a one-piece configuration. Accordingly the headband can be bent or injection molded into the desired shape and is only low in weight. A further improvement in the adaptability of the headphone can accordingly be achieved by the provision of a more flexible second portion 10*b*, that is to say the second portion is more flexible than the first. That can be achieved for example by the cross-section being altered in such a way that the second portion is shallower (than the first portion).

The various adjustment options for the transducer 30 mean that the headphone can be adapted in the optimum fashion to the respective head and ear shapes of a headphone wearer. In addition an optimum contact pressure in respect of the transducer against the ears of a headphone wearer is achieved, whereby the acoustics of the transducer are substantially improved. That has a very positive effect specifically in bass reproduction.

Due to the headband fitting directly at the back of the head of the headphone wearer, the fit of the headphone is not adversely affected by the formation of a bulge or roll of flesh at the nape of the neck, upon a movement of the head. As the contact pressure points or the contact locations of the headband 10*i* at the temporal bones or the temporal muscles are above the ear, the headphone according to the invention can also be worn in particular in combination with a pair of spectacles without involving a detrimental effect on the level of wearing comfort. The provision of the angled second portions or the spring side pieces, that is to say the transducer limbs, provides for mutual moment compensation for the two side pieces at the point 10*a* (of the left and right side pieces), thereby ensuring a constant contact pressure even when different sizes of head are involved. Tightening the head side pieces or the second portions counteracts migration of the pressure point, due to a changing pressure angle. The transducers 30 which are mounted pivotably or rotatably about the tilted longitudinal axis of the second portion provide for a combined horizontal and vertical angle compensation effect at the ear. To prevent a tilting effect in the direction of the pivot axis, elastic materials can be provided in the headband connection of the transducers. In addition thereto it is possible to provide a hinge or pivot which has a slip-preventing effect.

The above-described adjustment options for the headphone with behind-the-head headband according to the invention mean that the headphone can be adjusted in accordance with the individual feeling for wearing it, that is to say pressure against the head and the contact pressure. In addition the acoustic properties of the headphone can be influenced by adjustment of the contact pressure. If the behind-the-head headband is implemented in the form of a spring steel headband, it is possible to provide a very light headphone, based on the principle of a pair of spectacles. In addition implementation of the headphone by means of the behind-the-head headband ensures a firm tight fit on the head of the headphone wearer so that a headphone of that kind is suitable in particular in those areas of use in which a great freedom of movement is desirable, such as for example in sporting activities or on journeys.

Figure 6:
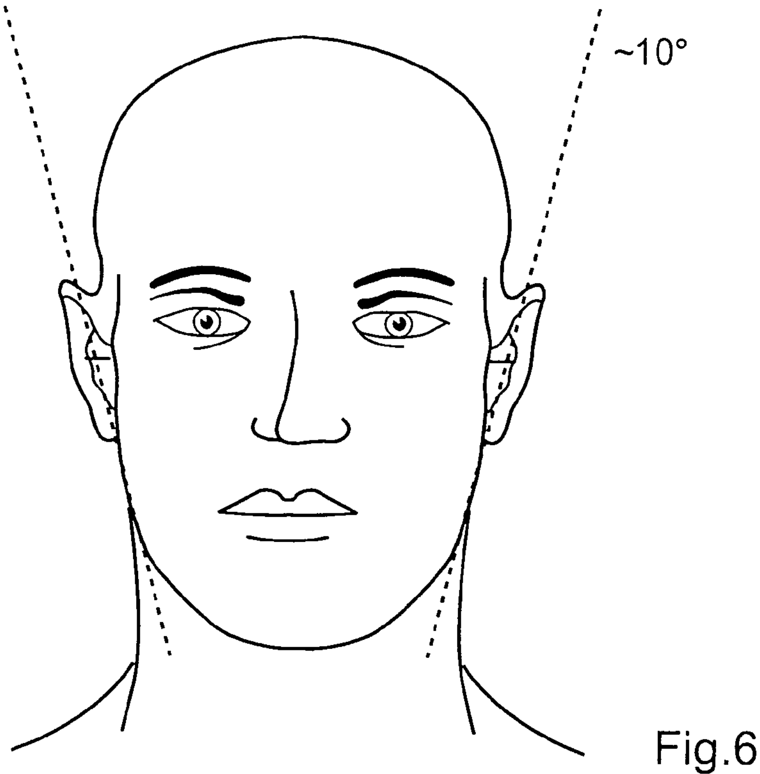
FIG. 6 is a view of a lateral head angle.

FIG. 6 shows a view of a lateral head angle which is generally 10°.

Figure 7:
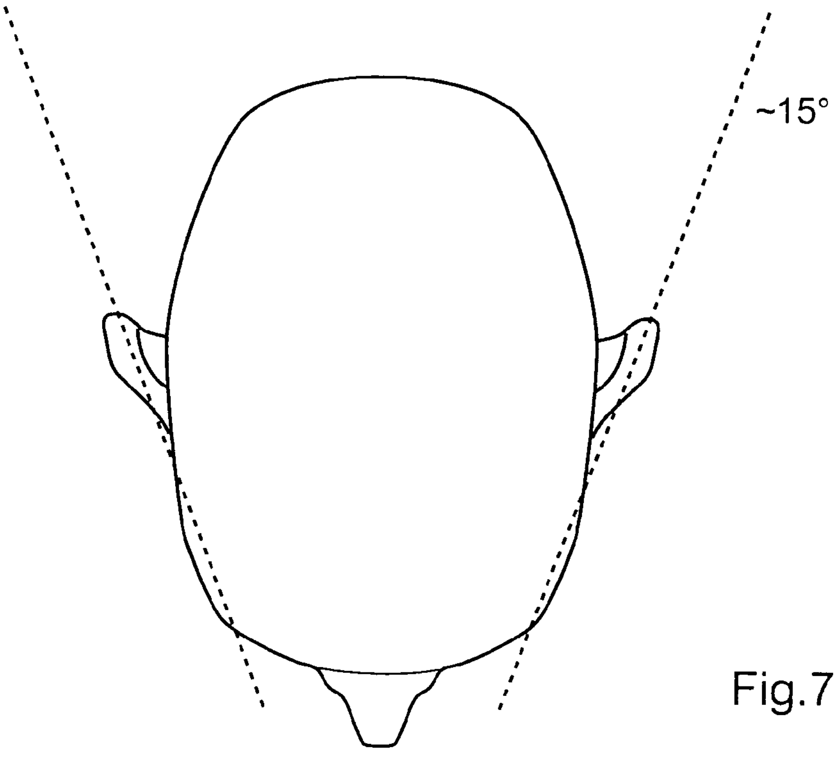
FIG. 7 shows a view of an ear angle.

FIG. 7 shows a view of an ear angle which is generally 15°.

In accordance with an alternative embodiment the headband can be in the form of a two-wire spring steel so that the electrical signals for transducers can be transmitted by way of the headband.

As an alternative thereto cables can be passed within the headband so that they are substantially invisible from the outside.

While the foregoing description and drawings represent the present invention, it will be obvious to those skilled in the art that various changes may be made therein without departing from the true spirit and scope of the present invention.

What is claimed is:

1. A headphone with behind-the-head headband comprising:

at least one electroacoustic transducer;

a behind-the-head headband for holding the electroacoustic transducer, said behind-the-head headband having at least a first and a second contact location for contact against a temporal bone of a wearer of the headphone;

spacing between the electroacoustic transducer and the first or second contact location being adjustable;

said behind-the-head headband having a first portion and at least one second portion, said first and second portions coming together at an angle location and a predetermined angle exists between the first and second portions;

said electroacoustic transducer being arranged at the second portion of the behind-the-head headband; and said electroacoustic transducer being displaceable along the longitudinal axis of the second portion of the behind-the-head headband in such a way that the spacing between the electroacoustic transducer and the first or second contact location as well as the spacing between the behind-the-head headband and the head of a wearer of the behind-the-head headband is adjusted.

2. The headphone as set forth in claim 1, wherein the electroacoustic transducer is adapted to be pivotable about the behind-the-head headband.

3. The headphone as set forth in claim 2, wherein at least one second portion of the behind-the-head headband is designed to be inclined inwardly.

4. The headphone as set forth in claim 1, wherein at least one second portion of the behind-the-head headband is designed to be inclined inwardly.

5. The headphone as set forth in claim 1, wherein the second portion of the behind-the-head headband is convexly bent.

6. The headphone as set forth in claim 1, wherein the electroacoustic transducer has a self-locking arresting action.

7. The headphone as set forth in claim 1, wherein the behind-the-head headband is of an integral configuration.

8. The headphone as set forth in claim 1, wherein the second portion is more flexible than the first portion.

9. The headphone as set forth in claim 1, wherein the behind-the-head headband is of a variable cross-section.

* * * * *